United States Patent [19]

Beavon

[11] 4,029,753

[45] June 14, 1977

[54] SULFUR PLANT TEMPERATURE CONTROL

[75] Inventor: David K. Beavon, Pasadena, Calif.

[73] Assignee: Ralph M. Parsons Company, Pasadena, Calif.

[22] Filed: Jan. 12, 1976

[21] Appl. No.: 648,198

[52] U.S. Cl. .............................. 423/574 R; 23/262; 122/1 R

[51] Int. Cl.$^2$ ......................................... C01B 17/04

[58] Field of Search .......... 423/573, 574, 576, 659; 23/262; 122/1

[56] References Cited

UNITED STATES PATENTS

| | | | |
|---|---|---|---|
| 2,200,529 | 5/1940 | Baehr et al. | 423/576 |
| 2,534,792 | 12/1950 | Nevins et al. | 23/262 |
| 2,631,087 | 3/1953 | Herndon | 423/569 |
| 2,834,655 | 5/1958 | Chute et al. | 423/574 X |
| 3,798,316 | 3/1974 | Beavon | 423/574 |
| 3,822,337 | 7/1974 | Wunderlich et al. | 423/574 X |

OTHER PUBLICATIONS

Bryant, H. S., "Oil and Gas Journal", Mar. 26, 1973, pp. 70–76.
Olsen, J. C., *Unit Processes and Principles of Chemical Engineering*, Van Nostrand Co., N. Y., 1932, pp. 1–3.

*Primary Examiner*—G. O. Peters
*Attorney, Agent, or Firm*—Christie, Parker & Hale

[57] ABSTRACT

An improvement to a Claus sulfur plant uses heat generated in the partial combustion of hydrogen sulfide to produce high pressure steam which is utilized before each catalytic conversion stage to heat the reactive gas stream to a temperature consonant with that required for the catalytic conversion of the sulfur dioxide and hydrogen sulfide in the gas stream to water and sulfur.

8 Claims, 1 Drawing Figure

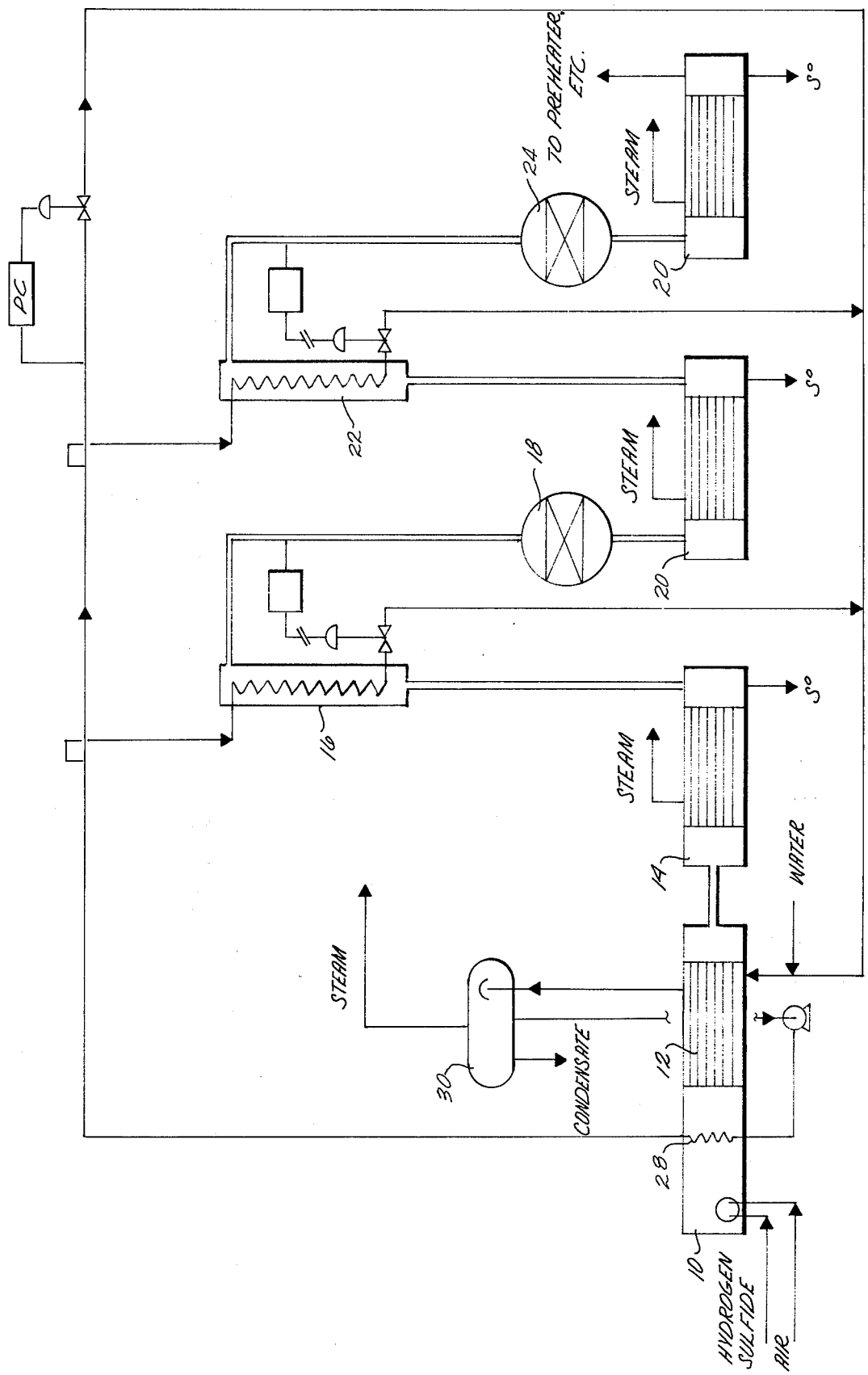

SULFUR PLANT TEMPERATURE CONTROL

BACKGROUND OF THE INVENTION

The Claus process is used to produce sulfur of extremely good quality from a variety of gas streams containing hydrogen sulfide. Claus plants are widely used as adjuncts of gas-desulfurization installations to prevent discharge of large amounts of air polluting sulfur compounds to the atmosphere.

The first step of the Claus process is the combustion of a portion of the hydrogen sulfide in the feed stream in a flame zone at temperatures of 2000–3000° F to produce water, sulfur dioxide, and some sulfur. Sufficient hydrogen sulfide is converted to sulfur dioxide to yield a 2:1 molar ratio of hydrogen sulfide to sulfur dioxide by limiting the amount of oxygen entering the flame zone. This 2:1 molar ratio is the stoichiometrically correct ratio for the reaction:

$$2H_2 + SO_2 \rightarrow 2H_2O + 3S \qquad (1)$$

to occur in the subsequent thermal and catalytic conversion zones of the Claus process.

Alternatively, all of the hydrogen sulfide in the feed stream is converted to sulfur dioxide in the flame zone, and then additional hydrogen sulfide is fed into the thermal conversion zone to yield a 2:1 molar ratio of hydrogen sulfide to sulfur dioxide.

The thermal conversion of sulfur dioxide and hydrogen sulfide occurs at temperatures above 1000° F, preferably between 2000° and 3000° F. Since the combustion and thermal conversion of hydrogen sulfide is exothermic, producing approximately 290,000 BTU per pound of hydrogen sulfide oxidized to sulfur, the thermal conversion zone must be cooled to maintain the desired temperature. The cooling is accomplished with water, which is vaporized as low pressure steam e.g., 100–200 psig steam.

To remove the elemental sulfur formed in the flame and thermal conversion zones, the reaction products are cooled in a condenser below the dew point of sulfur. As much sulfur as possible is removed in the condenser to shift the thermodynamic equilibrium of subsequent reactions toward the production of additional sulfur and enable downstream catalytic conversion stages to operate at lower temperatures without material condensation of sulfur which poisons the catalyst.

After condensing sulfur from the gas exiting the thermal conversion zone, the gas is reheated to a temperature consonant with that required for feed to a catalytic conversion zone. In the catalytic conversion zone hydrogen sulfide from the feed stream reacts with sulfur dioxide produced in the flame zone in the presence of catalyst, usually alumina or bauxite, to produce water and sulfur. The reaction products again are cooled in a condenser, and the sulfur is removed. The steps of reheating, reacting, and condensing are repeated as often as three or more times in order to remove as much sulfur as is economically feasible or as may be required by air pollution standards. After leaving the last sulfur condenser, the exhaust gases are either incinerated to convert all sulfur compounds to sulfur dioxide and then vented, or treated to remove residual sulfur components as by U.S. Pat. No. 3,752,877 issued to me.

It has been proposed to use low pressure steam generated in the thermal conversion zone to preheat the feed to the catalytic conversion stages. While adequate to supply some of the heat requirements, this low pressure steam does not adequately satisfy all process needs. Other process needs include regeneration of the catalyst by removing sulfur, carbon, and hydrocarbon deposits. The sulfur is removed by stripping it from the catalyst with hot gas, and low pressure steam of 150 to 200 psig (358–382° F) is not adequate for preheating the hot gas for this purpose. Carbon and hydrocarbon deposits are removed by preheating the catalyst with a hot gas and then burning the deposits with a preheated combustible gas; to that end low pressure steam is inadequate to preheat the catalyst and combustible gas. It has been found that steam of at least about 600 psig is required to satisfy all process requirements.

Although these needs can be provided by generating high pressure steam in the thermal conversion zone, this approach results in a loss in overall efficiency due to insufficient conversion in the thermal conversion zone. This increases the load on the catalytic conversion zones, thereby requiring for some installations the addition of extra Claus stages which are expensive to install and operate.

When available from outside the process, some versions of the Claus process use higher pressure steam for the preheaters. Because higher pressure steam often is not available, the Claus units constructed under my direction use natural gas fired line burners to reheat the gas leaving the condenser. However, both of these approaches are wasteful of energy since they consume energy generated outside the Claus process without utilizing the energy availble from the combustion of hydrogen sulfide. Furthermore, line burners are expensive, and can lead to upset conditions forming sulfur trioxide, which poisons the catalyst in the catalytic conversion zones.

SUMMARY OF THE INVENTION

According to the present invention there is provided an improved Claus process for the production of sulfur. In the process a gaseous stream comprising hydrogen sulfide and a source of oxygen are combined in a flame zone in proportions to convert, by combustion, sufficient hydrogen sulfide to sulfur dioxide to form gas stream in which the mole ratio of hydrogen sulfide to sulfur dioxide is about 2:1. The gas stream then is passed through a thermal conversion zone, where at a temperature above the dew point of sulfur, sulfur is thermally formed by the reaction of a portion of the hydrogen sulfide with sulfur dioxide. The formed sulfur is condensed to form a residual gas stream. Additional sulfur is formed in a plurality of catalytic conversion stages in series in which the residual gas stream is heated to a temperature sufficient to initiate catalytic reaction of hydrogen sulfide and sulfur dioxide. The heated gas stream is passed over a Claus catalyst to form sulfur, and the formed sulfur is condensed by cooling.

In accordance with the invention, the improvement comprises heating the residual gas stream following each stage of sulfur condensation to the catalytic initiation temperature by indirect heat exchange with high pressure steam generated by indirect flash heating of water in the flame zone to form steam at a pressure of at least about 600 psig. The quantity of steam formed is at least sufficient to heat the residual gas stream between each sulfur condensation and catalytic sulfur formation stage to the temperature required to initiate the catalytic reaction of sulfur dioxide with hydrogen sulfide to form elemental sulfur. In addition, this high pressure steam satisfactorily regenerates catalyst by stripping sulfur deposits and aids in preheating the catalyst to assist a combustion gas used to burn off carbon and hydrocarbon deposits.

In the preferred embodiment, a gas stream comprising hydrogen sulfide and a source of oxygen are combined in the flame zone of a Claus process for the production of sulfur. The proportions of hydrogen sulfide and oxygen are chosen so that sufficient hydrogen sulfide is converted by combustion to sulfur dioxide to form a gas stream in which the mole ratio of hydrogen sulfide to sulfur dioxide is about 2:1. The gas stream is passed through a thermal conversion zone where, at a temperature above the dew point of sulfur, sulfur is thermally formed by the reaction of a portion of the hydrogen sulfide with the sulfur dioxide. The formed sulfur is condensed to form a residual gas stream. Additional sulfur is formed in a plurality of catalytic conversion stages in series in which the residual gas stream is heated to a temperature sufficient to initiate catalytic reaction of hydrogen sulfide and sulfur dioxide. The heated gas streams are passed over a Claus catalyst to form sulfur. This is followed by condensing the formed sulfur by cooling. The residual gas stream is heated to the catalytic initiation temperature by indirect heat exchange with high pressure steam generated by indirect flash heating of the water in the flame zone to form steam at a pressure of at least about 600 psig. The quantity of steam formed is at least sufficient to heat the residual gas stream between each sulfur condensation and catalytic sulfur formation stage to the temperature required to initiate the catalytic reaction of the sulfur dioxide with the hydrogen sulfide to form elemental sulfur. The source of water used for the indirect flash heating is the water used to cool the thermal conversion zone.

DRAWING

The attached drawing depicts the Claus process as improved by my invention.

DESCRIPTION OF THE INVENTION

Referring to the attached drawing, a gas containing hydrogen sulfide and a source of oxygen, typically air, enters a flame zone 10 where a portion of the hydrogen sulfide is oxidized to water and sulfur dioxide along with some sulfur at a temperature of 2000–3000° F to provide a stream wherein the mole ratio of hydrogen sulfide to sulfur dioxide is about 2:1. After the reaction products are cooled and additional sulfur is formed in the thermal conversion zone 12, the product sulfur is removed in the first condenser stage 14. The gas then is reheated in the first reheater 16 to a temperature above the dew point of sulfur, normally from 480° to 700° F. The hydrogen sulfide and sulfur dioxide then react in the presence of catalyst, usually alumina or bauxite, to form sulfur and water in catalytic conversion stage 18. After the sulfur formed in stage 18 is removed in the second condenser stage 20, the residual gas is reheated in the second reheater stage 22 and reacted in the second catalytic conversion stage 24, followed by sulfur condensation in the third condenser stage 26. The reheating, catalytic conversion, and condensing steps may be repeated several times. However, doing so beyond three stages is of diminishing return.

According to the present invention, high pressure steam generated in the flame zone 10 is at least utilized to heat the gas in the reheaters 16 and 22. This may be accomplished by feeding water through conduits 28 contained in the flame zone 10 where the water is vaporized to high pressure steam for feed to the reheaters 16 and 22. Preferably, the water is the condensate from the thermal conversion steam drum 30, and the high pressure steam exiting from the reheaters 16 and 22 is returned to the steam drum 30 after use as a coolant for the thermal conversion zone 12. Makeup water is added as necessary.

In this arrangement, the steam generated in the flame zone is from about 5 to about 50%, preferably from about 10 to about 20%, of the steam generated in the thermal conversion zone. The steam leaving the flame zone is of at least about 600 psig (488° F), and preferably from about 600 to about 1000 psig (546° F). Preferably, steam pressure is controlled with a pressure controller and pressure control valve 32. The flow of steam to reheaters 16 and 22 is controlled by temperature control valves 34 and 36, respectively. The sensors for these control valves measure the temperature of the feed stream to the catalytic converters and thereby control the steam flow rate as a function of that temperature.

Although it is preferable to utilize high quality high pressure steam, it has been found that high pressure steam containing as much as 50% water functions satisfactorily. The reheaters are of any indirect heat exchange device known to the art. The conduits 28 used to convey the high pressure steam into the flame zone may be in any configuration known to the art such as a Lamont section, which has been found to generate high pressure steam efficiently.

Although the invention is depicted and described as a closed loop system using condensate from the waste heat reboiler steam drum as the water source for high pressure steam, any water source may be used, and the condensate from the reheaters may or may not be recycled to the low pressure boiler and steam drum.

The practice of the instant invention overcomes the above-mentioned disadvantages of other reheating systems used in the practice of the Claus system. There is thereby eliminated the need for costly line burners and their associated instrumentation. The operation of the Claus process is simplified, energy is conserved and operating costs reduced. The elimination of line burners minimizes production of sulfur trioxide caused by operating upsets of the line burners and subsequent poisoning of catalyst. In addition there is provided sufficient heat to strip sulfur deposits from the catalyst and to preheat fuel gas and/or air for the periodic burning off of carbon and hydrocarbon deposits during catalyst regeneration.

What is claimed is:

1. In a Claus process for the production of sulfur wherein a gaseous stream comprising hydrogen sulfide is combined with a source of oxygen in a flame zone in proportions to convert, by combustion, sufficient hydrogen sulfide to sulfur dioxide to form, with hydrogen sulfide added in a thermal conversion zone, a reaction gas stream wherein the mole ratio of hydrogen sulfide to sulfur dioxide is about 2:1, passing the reactive gas stream through the thermal converison zone where at a temperature above the dew point of sulfur, sulfur is thermally formed by reaction of a portion of the hydrogen sulfide with sulfur dioxide, from which the formed sulfur is condensed to form a residual gas stream, and wherein additional sulfur is formed by passing the residual gas stream through a plurality of catalytic conversion stages in series, and wherein the residual as stream is heated to a temperature sufficient to initiate catalytic reaction of hydrogen sulfide and sulfur dioxide prior to each stage, and formed sulfur is condensed following each catalytic conversion stage in a sulfur condensation stage, the improvement which comprises heating the residual gas stream to the catalytic initiation temperature by indirect heat exchange with high pressure steam generated by indirect flash heating of water in the flame zone to form steam at a pressure of at least about 600 psig, the quantity of steam formed being sufficient to at least heat the residual gas stream between each sulfur condensation and catalytic sulfur formation stage to a temperature required to initiate the catalytic reaction of sulfur dioxide with hydrogen sulfide to form elemental sulfur.

2. The process of claim 1 wherein steam of about 1000 psig is generated in the flame zone.

3. A process for the production of sulfur comprising:
 a. combining a gaseous stream including hydrogen sulfide with a source of oxygen in a flame zone in proportions to convert, by combustion, sufficient hydrogen sulfide to sulfur dioxide to form, with the hydrogen sulfide added in a thermal conversion zone, a reactive gas stream wherein the mole ratio of hydrogen sulfide to sulfur dioxide is about 2:1;
 b. passing the reactive gas stream through the thermal conversion zone;
 c. thermally forming sulfur by reaction of a portion of the hydrogen sulfide with sulfur dioxide in the thermal conversion zone at a temperature above the dew point of sulfur, wherein the temperature in the thermal conversion zone is maintained with cooling water;
 d. condensing the formed sulfur to form a residual gas stream;
 e. forming and condensing additional sulfur in a plurality of catalytic conversion stages and condensing stages in series by
  i. heating by indirect heat exchange with high pressure steam the residual gas stream to a temperature sufficient to initiate catalytic reaction of hydrogen sulfide and sulfur dioxide before each of the pluralities of catalytic conversion stages in series, wherein the high pressure steam is generated by indirect flash heating of water in the flame zone to form a steam at a pressure of at least about 600 psig, the source of the water being the water used to cool the thermal conversion zone, the quantity of stream formed being sufficient to at least heat the residual gas stream between each sulfur condensation stage and each catalytic sulfur formation stage to a temperature required to initiate the catalytic reaction of sulfur dioxide with hydrogen sulfide to form elemental sulfur:
  ii. forming additional sulfur in the plurality of catalytic conversion stages by passing the heated gas stream over a Claus catalyst; and
  iii. condensing formed sulfur following each catalytic conversion stage in a sulfur condensation stage.

4. The process of claim 3 wherein the steam, after it heats the residual gas stream by indirect heat exchange, is utilized to cool the thermal conversion zone.

5. The process of claim 3 wherein steam of about 1000 psig is generated in the flame zone.

6. The process of claim 3 wherein the water in the flame zone is supplemented by makeup water.

7. In a Claus process for the production of sulfur wherein a gaseous stream comprising hydrogen sulfide is combined with a source of oxygen in a flame zone in proportions to convert, by combustion, sufficient hydrogen sulfide to sulfur dioxide to form, with hydrogen sulfide added in a thermal conversion zone, a reaction gas stream wherein the mole ratio of hydrogen sulfide to sulfur dioxide is about 2:1, passing the reactive gas stream through the thermal conversion zone where at a temperature above the dew point of sulfur, sulfur is thermally formed in a thermal conversion zone by reaction of a portion of the hydrogen sulfide with suflur dioxide with attendant cooling and generation of low pressure steam to remove reaction exotherm of the thermal conversion zone, from which the formed sulfur is condensed to form a residual gas stream, and wherein additional sulfur is formed by passing the residual gas stream through a plurality of catalytic conversion stages in series, and wherein the residual gas stream is heated to a temperature sufficient to initiate catalytic reaction of hydrogen sulfide and sulfur dioxide prior to each stage, and formed sulfur is condensed following each catalytic conversion stage in a sulfur condensation stage, the improvement which comprises heating the residual gas stream to the catalytic initiation temperature by indirect heat exchange with high pressure steam generated by indirect flash heating of water in the flame zone to form high pressure steam at a pressure of at least about 600 psig, the quantity of high pressure steam formed being from 5 to 50% of the low pressure steam and sufficient to heat the residual gas stream between each sulfur condensation and catalytic sulfur formation stage to a temperature required to initiate the catalytic reaction of sulfur dioxide with hydrogen sulfide to form elemental sulfur.

8. A process for the production of sulfur comprising:
 a. combining a gaseous stream including hydrogen sulfide with aa source of oxygen in a flame zone in proportions to convert, by combustion, sufficient hydrogen sulfide to sulfur dioxide to form, with the hydrogen sulfide added in a thermal conversion zone, a reactive gas stream wherein the mole ratio of hydrogen sulfide to sulfur dioxide is about 2:1;
 b. passing the reactive gas stream through the thermal conversion zone;
 c. thermally forming sulfur in the thermal conversion zone by reaction of a portion of the hydrogen sulfide with sulfur dioxide in the thermal conversion zone at a temperature above the dew point of sulfur, wherein the temperature in the thermal conversion zone is maintained with generation of low pressure steam from cooling water;
 d. condensing the formed sulfur to form a residual gas stream;
 e. forming and condensing additional sulfur in a plurality of catalytic conversion stages and condensing stages in series by
  i. heating by indirect heat exchange with high pressure steam the residual gas stream to a temperature sufficient to initiate catalytic reaction of hydrogen sulfide and sulfur dioxide before each of the pluralities of catalytic conversion stages in series, the high pressure steam being generated by indirect flash heating of water in the flame zone to form a steam at a pressure of at least about 600 psig, the source of the water being the water used to cool the thermal conversion zone, the quantity of steam formed being from 5 to 50% of the low pressure steam generated in the thermal conversion zone and sufficient to heat the residual gas stream between each sulfur condensation stage and each catalytic sulfur formation stage to a temperature required to initiate the catalytic reaction of sulfur dioxide with hydrogen sulfide to form elemental sulfur;

ii. forming additional sulfur in the plurality of catalytic conversion stages by passing the heated gas stream over a Claus catalyst; and iii. condensing formed sulfur following each catalytic conversion stage in a sulfur condensation stage.

* * * * *

UNITED STATES PATENT AND TRADEMARK OFFICE
CERTIFICATE OF CORRECTION

PATENT NO. : 4,029,753
DATED : June 14, 1977
INVENTOR(S) : DAVID K. BEAVON

It is certified that error appears in the above—identified patent and that said Letters Patent are hereby corrected as shown below:

Column 2, line 31, for "availble" read -- available --; line 44, after "form" read -- a --. Column 5, line 4, for "as" read -- gas --; line 53, for "stream" read -- steam --. Column 6, line 15, for "suflur" read -- sulfur --; line 42, for "aa" read -- a --.

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*